(12) United States Patent
Sun et al.

(10) Patent No.: US 8,843,314 B2
(45) Date of Patent: Sep. 23, 2014

(54) HIGH FIDELITY HORIZONTAL POSITION ERROR ESTIMATION FOR VEHICULAR GPS/DR NAVIGATION

(71) Applicant: General Motors LLC, Detroit, MI (US)

(72) Inventors: Debo Sun, Windsor (CA); Curtis L. Hay, West Bloomfield, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 13/734,523

(22) Filed: Jan. 4, 2013

(65) Prior Publication Data

US 2014/0195151 A1     Jul. 10, 2014

(51) Int. Cl.
*G01S 19/48*     (2010.01)
*G01C 21/16*     (2006.01)
*G01C 21/28*     (2006.01)
*G01S 5/02*     (2010.01)

(52) U.S. Cl.
CPC .............. *G01C 21/165* (2013.01); *G01C 21/28* (2013.01); *G01S 19/48* (2013.01); *G01S 5/0263* (2013.01)
USPC .......................................... 701/472; 701/469

(58) Field of Classification Search
CPC ...... G01C 21/165; G01C 21/28; G01S 19/48; G01S 5/0263
USPC ........ 701/472, 469, 468, 479, 300, 480, 457; 340/988; 342/457, 357.23, 357.21, 342/357.22; 370/338; 455/456.1
See application file for complete search history.

(56) References Cited

U.S. PATENT DOCUMENTS

| 6,453,238 | B1 * | 9/2002 | Brodie et al. ................. 701/472 |
| 8,462,745 | B2 * | 6/2013 | Alizadeh-Shabdiz ........ 370/338 |
| 2012/0221244 | A1 * | 8/2012 | Georgy et al. ................ 701/472 |

* cited by examiner

*Primary Examiner* — Marthe Marc-Coleman
(74) *Attorney, Agent, or Firm* — Leydig, Voit & Mayer, Ltd.

(57) ABSTRACT

A method is provided for determining an Estimated Horizontal Position Error (EHPE) with respect to a navigation system onboard a telematics-equipped vehicle by utilizing a Global Navigation Satellite System (GNSS) navigation system in combination with a dead reckoning (DR) navigation system. The method includes: receiving GNSS positioning information from the GNSS navigation system; receiving DR positioning information from the DR navigation system; applying, by a telematics unit, a Kalman filter to the GNSS positioning information and the DR positioning information; calculating, by the telematics unit, the EHPE corresponding to the navigation system onboard the telematics-equipped vehicle based on the GNSS positioning information, the DR positioning information, and the Kalman filter.

18 Claims, 3 Drawing Sheets

HIGH FIDELITY HORIZONTAL POSITION ERROR ESTIMATION FOR VEHICULAR GPS/DR NAVIGATION

FIELD

The present disclosure relates generally in vehicle telematics systems and more particularly to error estimation with respect to telematics and navigation systems.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring, global navigation system aided position identification, map services, and turn-by-turn navigation assistance. Telematics units are often provisioned and activated at a point of sale when a subscriber purchases a telematics-equipped vehicle. Upon activation, the telematics unit can be utilized to provide a subscriber with telematics services such as those described herein.

One telematics service provided by TSPs is a Global Navigation Satellite System (GNSS) based navigation service. GNSS is a generic term referring to any of multiple satellite constellation-based global positioning networks including, for example, the Global Positioning System (GPS) constellation. Another GNSS constellation network is the Global Navigation Satellite System (GLONASS). A particular example of a GNSS based navigation service is one providing turn-by-turn (TBT) directions to a telematics unit based upon a specified destination and current conditions including the current location of the telematics unit. Several other GNSS systems are currently under development and are capable of providing at least partial positioning functionality.

GNSS measurements are inherently noisy, and the measurement noise is difficult to model in advance due to environmental changes (e.g., open sky versus urban canyon) and/or variable satellite coverage. Without a reference position (i.e., the "real" position of the GNSS receiver), a navigation system cannot determine the degree of measurement error with respect to real-time measurements. This causes problems with respect to the provision of TBT directions and other navigation-related services to telematics subscribers—for example, indicating a subscriber is off-course relative to a driving route and recalculating driving directions when the subscriber is actually on-course.

The above body of information is provided for the convenience of the reader. The foregoing describes a suitable environment for which the described system and method are provided, and is not an attempt to review or catalog the prior art.

SUMMARY

In an implementation, the present invention provides a method for determining an Estimated Horizontal Position Error (EHPE) with respect to a navigation system onboard a telematics-equipped vehicle by utilizing a Global Navigation Satellite System (GNSS) navigation system in combination with a dead reckoning (DR) navigation system. The method includes: receiving GNSS positioning information from the GNSS navigation system; receiving DR positioning information from the DR navigation system; applying, by a telematics unit, a Kalman filter to the GNSS positioning information and the DR positioning information; calculating, by the telematics unit, the EHPE corresponding to the navigation system onboard the telematics-equipped vehicle based on the GNSS positioning information, the DR positioning information, and the Kalman filter.

In a further implementation, the method is implemented as computer-executable instructions stored on a non-transitory computer-readable medium.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Before discussing the details of the invention and the environment wherein the invention may be used, a brief overview is given to guide the reader. In general terms, not intended to limit the claims, a system and method are described herein for effectively determining an Estimated Horizontal Position Error (EHPE) with respect to a navigation system onboard a telematics-equipped vehicle by utilizing a GPS navigation system in combination with a dead reckoning (DR) navigation system. It will be appreciated that the principles described herein are not limited to vehicles, but are particularly applicable to apparatuses including a telematics unit having an integrated geographic location positioning subsystem such as, for example, a Global Navigation Satellite System (GNSS) receiver capable of selectively receiving/processing GNSS signals from multiple GNSS constellations, as well as a dead reckoning (DR) navigation system. Examples of potentially selectable GNSS constellations include GPS and GLONASS to name just two.

In general, the illustrative examples described herein pertain to estimating the EHPE of a vehicle navigation system based on received GNSS and DR information. The vehicle navigation system determines root mean square (RMS) estimations of GNSS measurement errors in both the x- (East) and y- (North) directions using the received DR information, as well as RMS estimations of DR propagation errors in both the x- and y-directions using the received GNSS information. An algorithm is then be used to obtain the EHPE.

Figure 1:
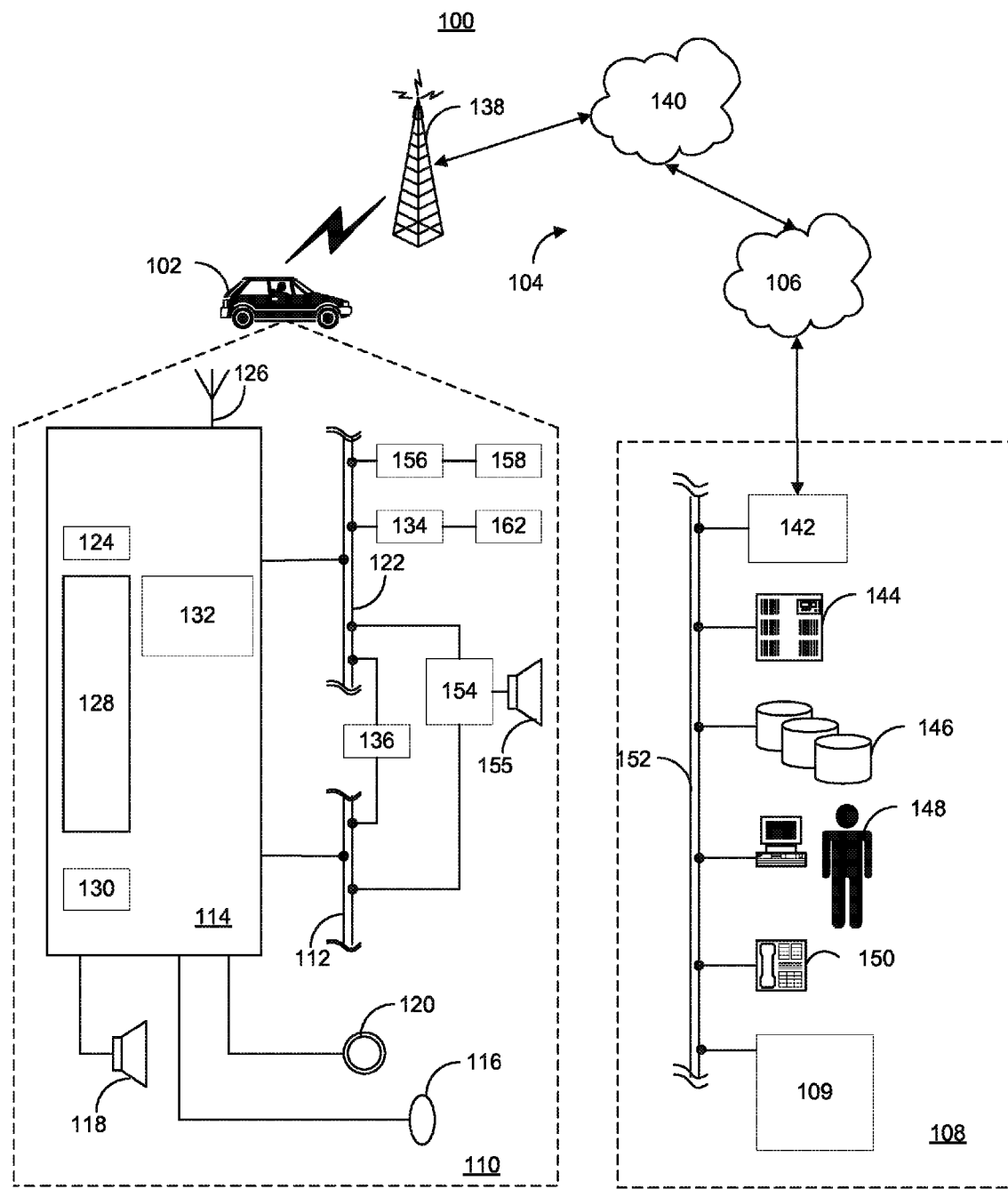
FIG. 1 is a schematic diagram of an operating environment for a mobile vehicle communication system usable in implementations of the described principles.

An exemplary computing and network communications environment is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a mobile wireless network system 104, a land network 106 and a communications center 108. It should be appreciated that the overall architecture, setup and operation, as well as the individual components of the communication system 100 is generally known in the art. In accordance with an illustrative example, the communication center 108 includes a GNSS control center 109 incorporating functional components facilitating over-the-air configuration of GNSS receivers integrated with/within telematics units such as a telematics unit 114. Thus, the following paragraphs provide a brief overview of an exemplary communication system 100. However, other systems are contemplated that are capable of incorporating the described GNSS receiver and GNSS control center functionality described herein.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via mobile wireless communications. The vehicle 102 includes hardware 110 such as, for example, the telematics unit 114, a microphone 116, a speaker 118 and buttons and/or controls 120 integrated with the telematics unit 114.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 provides a variety of services through communications with the communications center 108. The telematics unit 114 includes an electronic processor 128, electronic memory 130, a mobile wireless component 124 including a mobile wireless chipset, a dual function antenna 126 (both GNSS and mobile wireless signal), and a GNSS component 132 including a GNSS chipset. In one example, the mobile wireless component 124 comprises an electronic memory storing a computer program and/or set of computer-executable instruction sets/routines that are transferred to, and executed by, the processing device 128. The mobile wireless component 124 constitutes a network access device (NAD) component of the telematics unit 114.

The telematics unit 114 provides, for users, an extensive/extensible set of services. Examples of such services include: GNSS-based mapping/location identification, turn-by-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 154. It will be appreciated that the calculation-related processing may occur at the telematics unit or may occur at a communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The above-listed services are by no means an exhaustive list of the current and potential capabilities of the telematics unit 114, as should be appreciated by those skilled in the art. The above examples are merely a small subset of the services that the telematics unit 114 is capable of offering to users. Moreover, the telematics unit 114 includes a number of known components in addition to those listed above that have been excluded since they are not necessary to understanding the functionality discussed herein below.

Vehicle communications use radio transmissions to establish a communications channel with the mobile wireless network system 104 so that both voice and data signals can be sent and received via the communications channel. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component.

The microphone 116 provides the driver or other vehicle occupant with a means for inputting verbal or other auditory commands, and can be equipped with an embedded voice processing unit utilizing a human/machine interface (HMI) technology known in the art. The speaker 118 provides verbal output to the vehicle occupants and can be either a stand-alone speaker specifically dedicated for use with the telematics unit 114 or can be part of an audio component 154. In either case, the microphone 116 and the speaker 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of the infotainment center 136. The audio component 154 may contain a speaker system 155, or may utilize the speaker 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control. Further, it will be appreciated that the processor 128, electronic memory 130, and vehicle sensors 162 are capable of being used together as a dead reckoning (DR) navigation system, where according to instructions stored on the electronic memory 130 executed by the processor 128, the telematics unit 114 is able to estimate a relative vehicle position based on distance and heading measurements obtained from the sensors 162.

The mobile wireless network system 104 is, for example, a cellular telephone network system or any other suitable wireless system that transmits signals between mobile wireless devices, such as the telematics unit 114 of the vehicle 102, and land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 with the land network 106. For example, the MSC 140 includes a remote data server.

As appreciated by those skilled in the art, the mobile wireless network system includes various cell tower/base station/MSC arrangements. For example, a base station and a cell tower could be co-located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

The communications center 108 is configured to provide a variety of back-end services and application functionality to the hardware 110. The communications center 108 includes, by way of example, network switches 142, servers 144, databases 146, live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Switch 142, which can be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center.

Figure 2:
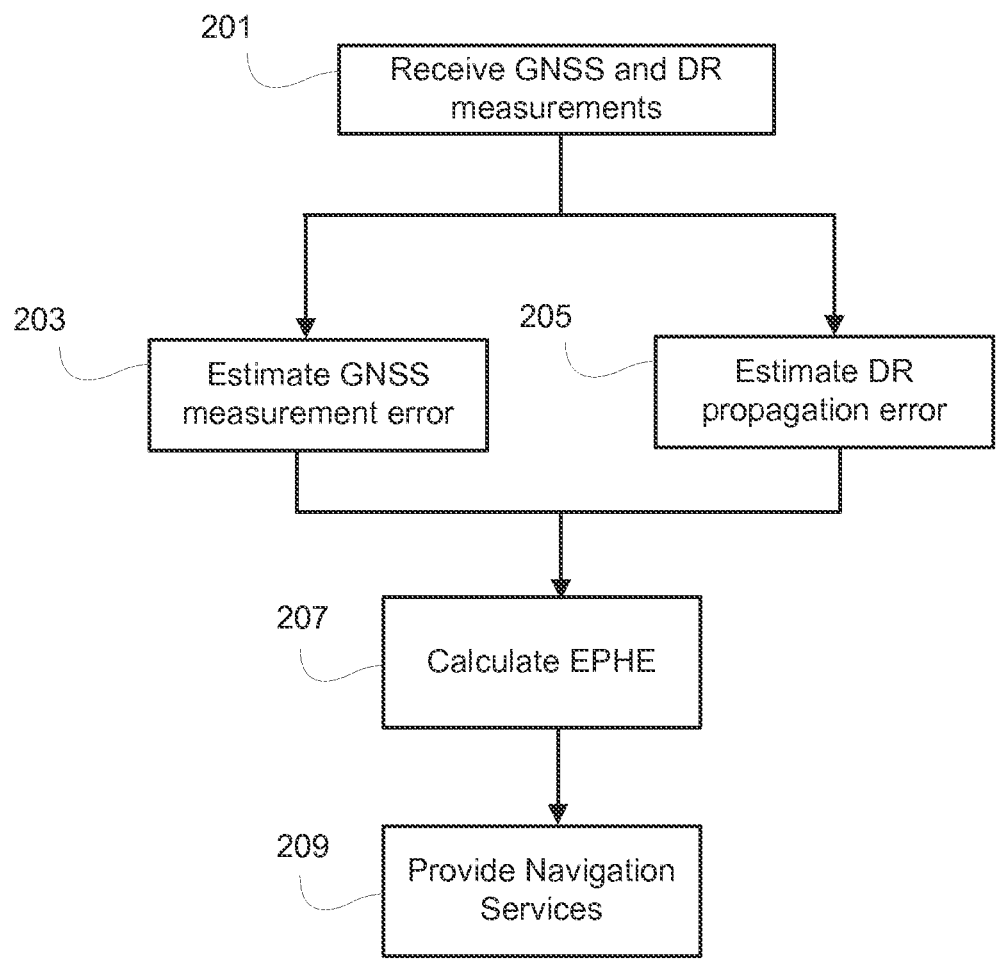
FIG. 2 is a flowchart depicting a general process for determining an EHPE in accordance with an exemplary implementation of the described principles.

With further reference to the architecture of FIG. 1, and turning more specifically to FIG. 2, an exemplary process 200 is shown for determining EHPE with respect to a vehicle navigation system. Estimated Horizontal Position Error (EHPE) is a numerical value describing the radius of a circle that would contain the actual position to a certainty of approximately 67%. According to implementations of the present invention, the EHPE is a root mean square (RMS) value that considers the standard deviation as well as the mean value, which allows for greater accuracy. Theoretically it can be calculated with $Cov(X^+-X)=E[(X^+-X)(X^+-X)^T]$, where X denotes the true value (i.e., true position), X+ denotes the estimated value, E denotes a mean or mathematic expectation of a random variable, and T denotes the transpose of a matrix or vector. If x is a scalar, the equation can be simplified to $Cov(x^+-x)=Var(x^+-x)=E(x^+-x)^2$.

In a Kalman filter, the equation $Cov(X^+-X)=P^+$ could be used to calculate EHPE, where $P^+$ is the filtering error covariance, when process noise and measurement noise of the Kalman filter are well-known. Similarly, in an example where GNSS pseudorange measurement noises are well-known or modeled, EHPE can be calculated from $Cov(dX)=(H^TH)^{-1}H^TCov(d\rho)H(H^TH)^{-1}$, where dρ denotes pseudorange measurement error or noise, dX denotes the error in position and time estimate, and H is the matrix describing the connection between the measurements and X. However, in a vehicle navigation system where process noise, measurement noise, and/or pseudorange measurement noises are not well-known or not suitable to be accurately modeled, the aforementioned Kalman filter methodology cannot be applied.

Implementations of the present invention rely on the dead reckoning (DR) navigation system of the vehicle, which obtains position measurements independently of a GNSS navigation system, to quantify errors introduced by the GNSS navigation system alone. However, the position measurements obtained by a DR system are also subject to measurement error—namely, a DR propagation error that is mainly caused by azimuth error and odometer measurement error. Thus, to effectively model GPS measurement error in combination with the DR navigation system, DR propagation error should be accounted for (and should be removed).

As shown in FIG. 2, the vehicle telematics unit, which includes or is connected to both a GNSS navigation system and a DR system, receives GNSS and DR measurements at stage 201.

At stage 203, the telematics unit estimates GNSS measurement error in the x- and y-directions using the received GNSS and DR measurements. Suppose GNSS position measurement in the y-direction is $Y_{GPS}$, and the DR propagated position in the y-direction is $y_{DR}$. The difference between the GPS measurement and the DR propagation measurement of the y-position of the vehicle can be expressed as:

$$\Delta y = y_{DR} - y_{GPS} \qquad \text{Eq. (1)}$$

If there are n measurements of $y_{GPS}$ and n corresponding propagation values of $y_{DR}$, $\Delta y$ has n measurements.

$\Delta y$ can be expressed as:

$$\Delta y = M_y + k_{y1} x + k_{y2} y + w_y \qquad \text{Eq. (2)}$$

where $M_y$ is a constant consisted of the GPS measurement bias and the DR constant error, $k_{y1}$ is a coefficient mainly relating to the heading error of DR, $k_{y2}$ is a coefficient mainly relating to the DR scale factor, $w_y$ is the noise coming from both GPS and DR, and x is the DR propagation distance in the x-direction.

The noise from DR is generally small relative to GPS measurements, so $w_y$ mainly comes from the GPS measurements. Hence, the variance of $w_y$ is approximately equal to $R_y$GPS, which is the variance value of $w_y$ coming from only the GPS measurements:

$$Var(w_y) \approx R_{yGPS} \qquad \text{Eq. (3)}$$

Using the difference between the GPS measurement and the DR measurement, $\Delta y$, and through applying a least square algorithm, the parameters $M_y$, $k_{y1}$, and $k_{y2}$ can be estimated, with the estimates being expressed as $\hat{M}_y$, $\hat{k}_{y1}$, and $\hat{k}_{y2}$, respectively. Using Eq. (2) above, the following can be used to solve for an estimated $\hat{w}_y$:

$$\hat{w}_y = \Delta y - \hat{M}_y - \hat{k}_{y1} - \hat{k}_{y2} \qquad \text{Eq. (4)}$$

Then, using Eq. (3) above, the variance of GPS measurement error in the y-direction can be calculated with:

$$R_{yGPS} \approx \frac{1}{n}\sum_{i=1}^{n} \hat{w}_y^2(i) \qquad \text{Eq.(5)}$$

where n is the number of measurements. Considering the mean value $\hat{M}_y$, the root mean square (RMS) of the GPS measurement error is:

$$\text{RMS}_{yGPS} \approx \frac{1}{n}\sum_{i=1}^{n} \hat{w}_y^2(i) + \hat{M}_y^2 \qquad \text{Eq.(6)}$$

The RMS of the GPS measurement error can similarly be calculated in the x-direction using the following set of equations:

$$\Delta x = x_{DR} - x_{GPS} \qquad \text{Eq. (7)}$$

$$\hat{w}_x = \Delta x - \hat{M}_x - \hat{k}_{x1} - \hat{k}_{x2} \qquad \text{Eq. (8)}$$

$$R_{xGPS} \approx \frac{1}{n}\sum_{i=1}^{n} \hat{w}_y^2(i) \qquad \text{Eq.(9)}$$

$$\text{RMS}_{xGPS} \approx \frac{1}{n}\sum_{i=1}^{n} \hat{w}_y^2(i) + \hat{M}_x^2 \qquad \text{Eq. (10)}$$

At stage 205, the telematics unit estimates DR propagation error in the x- and y-directions using the received GNSS and DR measurements. It will be appreciated that for a combined GPS and DR system according to this exemplary implementation, DR propagation error is measured after each step (e.g., from time k to time k+1). The DR propagation error mainly relates to heading error and the distance propagated, and can be calculated with $\hat{y}_{k+1/k} - \hat{y}_k$, where $\hat{y}_{k+1/k}$ is a one step prediction from time k to k+1 and $\hat{y}_k$ is the estimate at k.

Since $\hat{y}_{k+1/k} - \hat{y}_k$ not only contains the propagation error, but also contains the real distance change, consider the following equation:

$$\delta y_{k+1} = (\hat{y}_{k+1/k} - \hat{y}_k) - (y_{GPS,k-1} - y_{GPS,k}) \qquad \text{Eq. (11)}$$

where $y_{GPS,k+1}$ and $y_{GPS,k}$ are GPS measurements at k+1 and k, respectively. Using this Eq. (11), the real distance change is removed in $\delta y_{k+1}$. As a result, $\delta y_{k+1}$ contains only the DR propagation error and the GPS measurement error (or at least part of the GPS measurement error) since GPS measurements are temporally related (e.g., by the Kalman filter of the GPS receiver).

From the foregoing, the RMS of the DR propagation error in the y-direction can be calculated from:

$$\text{RMS}_{yDR} = \frac{1}{n-1}\sum_{i=1}^{n-1} \delta y_i^2 \qquad \text{Eq.(12)}$$

In the x-direction, the RMS of the DR propagation error can similarly be calculated using the following equations:

$$\delta x_{k+1} = (\hat{x}_{k+1/k} - \hat{x}_k) - (x_{GPS,k+1} - x_{GPS,k}) \qquad \text{Eq. (13)}$$

$$\text{RMS}_{xDR} = \frac{1}{n-1}\sum_{i=1}^{n-1} \delta x_i^2 \qquad \text{Eq.(14)}$$

It will be appreciated that DR propagation error is related to distance propagated. Thus, for a predetermined propagation time (e.g., the interval from time k to k+1), the DR propagation error may be proportional to the speed of the vehicle (i.e., higher vehicle speeds correlate to higher DR propagation error).

At stage 207, the telematics unit calculates the EHPE using an algorithm. This algorithm is developed from the knowledge or principle of the Kalman filter of GPS/DR. Generally in a Kalman filter, $\hat{X}_{k+1} = \hat{X}_{k+1/k} + G(Z_k - L\hat{X}_{k+1/k})$, where $\hat{X}_{k+1}$ is the estimate at k+1, $\hat{X}_{k+1/k}$ is the one step prediction from k to k+1, G is the Kalman filter gain, $\hat{X}_k$ is the measurement, L is a measurement matrix. In the EHPE calculation algorithm development, a scalar Kalman filter is used with respect to the position of the vehicle in the y-direction, as expressed by the following equations:

$$\hat{y}_{k+1} = \hat{y}_{k+1/k} + g_y(z_k - \hat{y}_{k+1/k}) \qquad \text{Eq. (15)}$$

$$\hat{y}_{k+1} = (1-g_y)\hat{y}_{k+1/k} + g_y z_k \qquad \text{Eq. (16)}$$

where $0 < g_y < 1$, and $g_y$ can be obtained from G·L. Then, from Eq. (14), it can be seen that:

$$Var(\hat{y}_{k+1}) = (1-g_y)^2 Var(\hat{y}_{k+1/k}) + g_y^2 Var(z_k) \qquad \text{Eq. (17)}$$

where $Var(\hat{y}_{k+1/k}) = Var(\hat{y}_k) + Var(DR_{y,k})$, where $Var(DR_{y,k})$ is the variance of DR propagation error—i.e., $Var(\hat{y}_{k+1/k} - \hat{y}_k)$.

When the Kalman filter is steady (i.e., $Var(\hat{y}_{k+1})=Var(\hat{y}_k)$), the following equation can be obtained:

$$Var(\hat{y}_k) = \frac{(1-g_y)^2}{2g_y-g_y^2}Var(DR_{y,k}) + \frac{g_y^2}{2g_y-g_y^2}Var(z_k) \quad \text{Eq.(18)}$$

From the Kalman filter equations, it can be proved that:

$$Var(\hat{y}_k)<Var(z_k) \quad \text{Eq. (19)}$$

$$Var(\hat{y}_k)<Var(DR_{y,k})+Var(z_k) \quad \text{Eq. (20)}$$

Using Eq. (20) provides a larger tolerance for unpredicted errors generated in the Kalman filter.

$RMS(\hat{y})$ can be expressed as:

$$RMS(\hat{y})=Var(\hat{y})+M_{yEst}^2 \quad \text{Eq. (21)}$$

where $M_{yEst}=(E[\hat{y}])$. In other words, the RMS value of the variable $\hat{y}$ is the variance value of $\hat{y}$ plus the mean square of $\hat{y}$.

From Equations (20) and (21), the following relationship is chosen (conservatively):

$$RMS(\hat{y})=RMS_{yDR}+RMS_{yGPS} \quad \text{Eq. (22)}$$

Similarly, $RMS(\hat{x})$ is expressed as:

$$RMS(\hat{x})=RMS_{xDR}+RMS_{xGPS} \quad \text{Eq. (23)}$$

Then, based on the values of $RMS(\hat{y})$ and $RMS(\hat{x})$ as determined from equations (22) and (23), the EHPE is calculated as:

$$EHPE = \sqrt{RMS(\hat{y}) + RMS(\hat{x})} \quad \text{Eq.(24)}$$

It will be appreciated that, although the foregoing paragraphs provide a full description of why the EHPE can be represented by Eq. (24), the telematics unit at stage 207 may only be using the $RMS_{yDR}$, $RMS_{yGPS}$, $RMS_{xDR}$, and $RMS_{xGPS}$, as calculated above in stages 203 and 205 along with Eqs. (22), (23), and (24) to arrive at a value for EHPE.

In a further implementation, the following Eqs. (25) and (26) may be used instead of Eqs. (22) and (23) to arrive at an EHPE that accounts for the effect of Kalman filter gain:

$$RMS(\hat{y}) = 2\left[\frac{(1-g_y)^2}{2g_y-g_y^2}RMS_{yDR} + \frac{g_y^2}{2g_y-g_y^2}RMS_{yGPS}\right] \quad \text{Eq.(25)}$$

$$RMS(\hat{x}) = 2\left[\frac{(1-g_x)^2}{2g_x-g_x^2}RMS_{xDR} + \frac{g_x^2}{2g_x-g_x^2}RMS_{xGPS}\right] \quad \text{Eq.(26)}$$

Herein, the factor of 2 is given in Eqs (25) and (26) because the means of DR and GPS are considered in these two equations.

In yet another further implementation, GPS may become unavailable (e.g., during a GPS outage), and in such situations the EHPE is determined by both the DR initial horizontal position error and the DR propagation error. The DR initial horizontal position error is determined by the EHPE at the last GPS measurement when the GPS outage occurs, and the DR propagation error is determined by the heading error and the distance propagated. The heading error can be expressed as:

$$\delta\theta(t) = \delta\theta_0 + \sigma_b t + \sigma_w \sqrt{t} \quad \text{Eq.(27)}$$

where $\delta\theta(t)$ is the estimated heading error (EHE) during GPS outage, $\delta\theta_0$ is the initial EHE when GPS outage occurs, $\sigma_b$ is the gyro constant drift (standard deviation), $\sigma_w$ is the standard deviation of gyro measurement noise (white), and t is propagation time. These parameters can then be used according to conventional methods to calculate an EHPE by multiplying EHE with distance travelled.

At stage 209, the calculated EHPE is utilized by the vehicle navigation system or call center to provide navigation services. For example, by using calculated EHPE values, the vehicle navigation system or call center can notify a telematics subscriber of an estimated error associated with a current location reading. In further examples, the EHPE information is used to plan or re-plan routes or determine a search area for a map matching system. It will be appreciated that the foregoing examples are merely exemplary, and that one skilled in the art would be able to utilize an accurately calculated EHPE according to implementations of the present invention for a variety of applications.

It will be appreciated that the equations for calculating $\Delta y$ and $\Delta x$ shown above are simplified versions only using east-north distance, but implementations of the present invention may also take into account altitude information obtained through a GNSS receiver. For example, the relationship between the distances in East (x) and North (y) with the altitude considered are expressed by the following equations:

$$\Delta y_i = (Latitude_{i+1} - Latitude_i) \cdot (M + Altitude_i)$$

$$\Delta x_i = (Longitude_{i+1} - Longitude_i) \cdot (N + Altitude_i) \cdot \cos(Latitude_i), i=1,2,\ldots,n$$

where M is the meridian radius at $Latitude_i$, and N is the prime vertical radius at $Latitude_i$.

Figure 3:
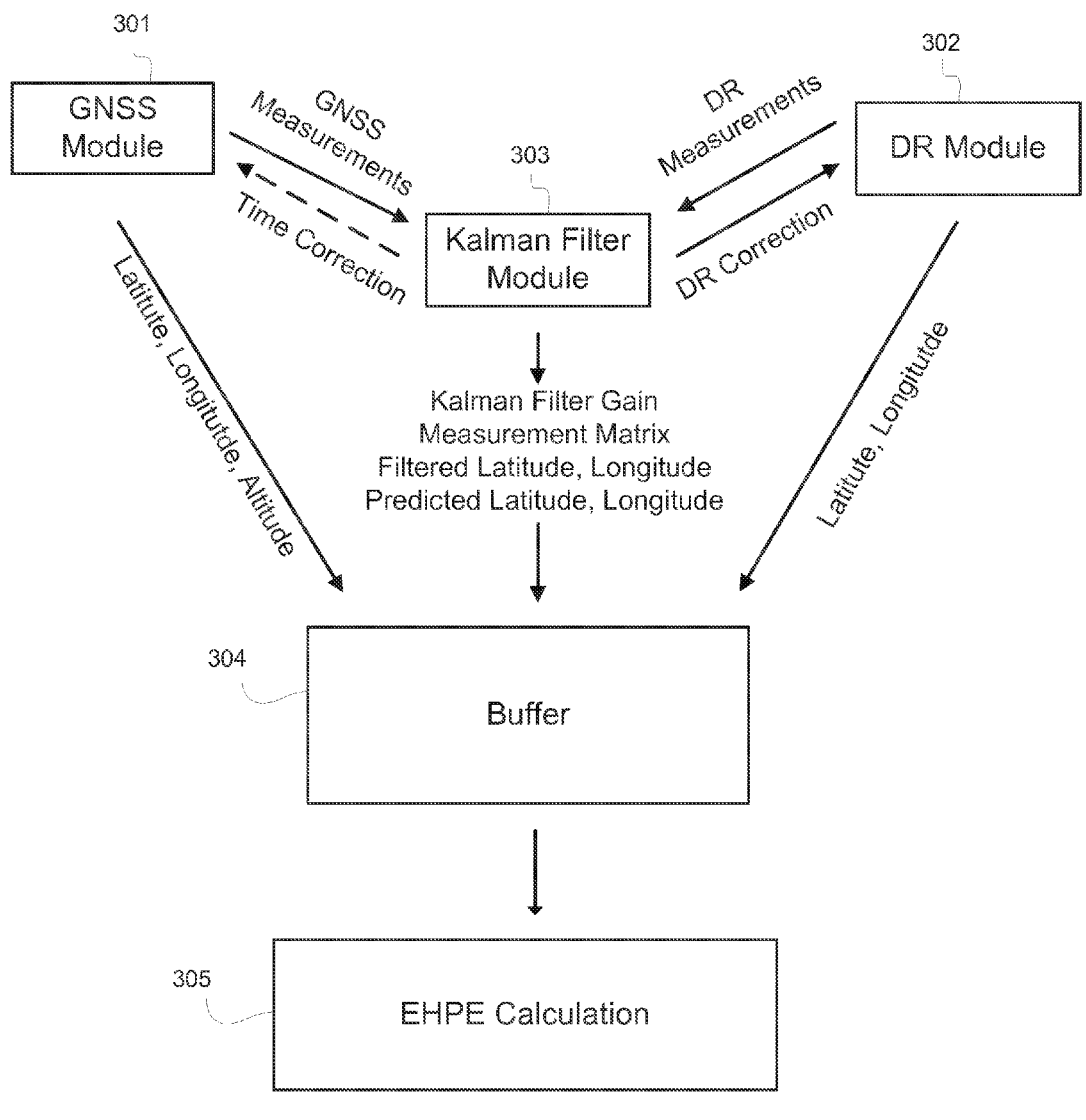
FIG. 3 is a block diagram depicting the interaction between various modules in determining an EHPE in accordance with an exemplary implementation of the described principles.

Turning now to FIG. 3, an exemplary diagram 300 of the different modules used for determining EHPE is depicted, with reference arrows showing the flow of information from one module to the other. It will be appreciated that these modules may be implemented through various combinations of the hardware and/or software described above with reference to FIG. 1—e.g., the GNSS navigation system, the telematics unit, vehicle sensors, etc.

As shown in FIG. 3, GNSS module 301 and DR module 302 generate positioning information that is sent to a Kalman Filter module 303. The Kalman Filter module 303 applies a Kalman filter to the GNSS measurements and DR measurements to generate filtered and predicted latitude and longitude values. It will be appreciated that the filtered latitude and longitude values are fed back into the DR module 302 for correction of the positioning information provided by the DR module 302. It will further be appreciated that the Kalman Filter module 303 may further provide time feedback to the GNSS module 301 (for tight integration of GPS/DR case) to synchronize the time associated with the GNSS measurements and the DR measurements.

A buffer 304 stores information received from the GNSS module 301, DR module 302, and Kalman Filter module 303, including for example Latitude, Longitude, and Altitude information from the GNSS module 301, Latitude and Longitude information from the DR module 302, and Kalman Filter gain, a measurement matrix, filtered latitude and longitude values, and predicted latitude and longitude values from the Kalman Filter module 303. A table showing exemplary data stored by the buffer is provided below:

TABLE I

Buffer Parameters

| | |
|---|---|
| From GPS: | (t1, GLat1, GLong1, h1), . . . , (tn, GLatn, GLongn, hn) |
| From DR: | (t1, DRLat1, DRLong1), . . . , (tn, DRLatn, DRLongn) |
| From Kalman Filter | Filtered: KFLati, KFLongi<br>Predicted: PDLati, PDLongi<br>Kalman filter gain; Measurement matrix |

Using the data from the buffer 304, a processor performs the EHPE calculation 305 according to the following steps:

Calculate Δy and Δx (see Eqs. (1) and (7) above):
e.g.: $\Delta y_i = (DRLati - GLati) \times (M+hi)$, i=1, 2, . . . , n, where M is meridian radius;
e.g.: $\Delta x_i = (DRLongi - GLongi) \times (N+hi) \times \cos(DRLati)$, i=1, 2, . . . , n, where N is prime vertical radius;

Calculate $RMS_{yGPS}$ and $RMS_{xGPS}$ (see Eqs. (6) and (10) above);

Calculate $\delta y_{k+1}$ and $\delta x_{k+1}$ using filtered and predicted latitude and longitude and GPS measurements;

Calculate $RMS_{yDR}$ and $RMS_{xDR}$ (see Eqs. (12) and (14) above);

Calculate $RMS(\hat{y})$ and $RMS(\hat{x})$ (see Eqs. (22) and (23) above or, if Kalman filter gain and measurement matrix are considered, Eqs. (25) and (26) above); and Calculate EHPE (see Eq. (24) above).

It will thus be appreciated that the described system and method allows for effectively determining an Estimated Horizontal Position Error (EHPE) with respect to a navigation system onboard a telematics-equipped vehicle by utilizing a GNSS navigation system in combination with a dead reckoning (DR) navigation system. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for determining an Estimated Horizontal Position Error (EHPE) with respect to a navigation system onboard a telematics-equipped vehicle by utilizing a Global Navigation Satellite System (GNSS) navigation system in combination with a dead reckoning (DR) navigation system, the method comprising:

receiving GNSS positioning information from the GNSS navigation system;

receiving DR positioning information from the DR navigation system;

applying, by a telematics unit, a Kalman filter to the GNSS positioning information and the DR positioning information;

calculating, by the telematics unit, the EHPE corresponding to the navigation system onboard the telematics-equipped vehicle based on the GNSS positioning information, the DR positioning information, and the Kalman filter, wherein calculating the EHPE comprises:

calculating a first root mean square (RMS) value associated with the GNSS positioning information in a first direction and a second RMS value associated with the GNSS positioning information in a second direction.

2. The method of claim 1, wherein calculating the EHPE further comprises:

calculating a first difference between a GNSS measurement of the vehicle location and a DR propagation measurement of the vehicle location in a first direction and a second difference between the GNSS measurement of the vehicle location and the DR propagation measurement of the vehicle location in a second direction.

3. The method of claim 2, wherein calculating the first difference and the second difference is performed according to the following formulas:

$$\Delta y = (DR\text{Lat} - GL\text{at}) \times (M+h); \text{ and}$$

$$\Delta x = (DR\text{Long} - GL\text{ong}) \times (N+h) \times \cos(DR\text{Lat});$$

where M is meridian radius, N is prime vertical radius, Δy is the difference in the first direction, Δx is the difference in the second direction, DRLat is a DR propagation measurement in the first direction, GLat is a GNSS measurement in the first direction, h is a GNSS measurement of altitude, DRLong is a DR propagation measurement in the second direction, and GLong is a GNSS measurement in the second direction.

4. The method of claim 1, wherein calculating the first RMS value associated with the GNSS positioning information in the first direction and the second RMS value associated with the GNSS positioning information in the second direction is performed according to the following formulas:

$$RMS_{yGPS} \approx \frac{1}{n}\sum_{i=1}^{n} \hat{w}_y^2(i) + \hat{M}_y^2; \text{ and}$$

$$RMS_{xGPS} \approx \frac{1}{n}\sum_{i=1}^{n} \hat{w}_x^2(i) + \hat{M}_x^2;$$

where $RMS_{yGPS}$ is the first RMS value associated with the GNSS positioning information in the first direction, $RMS_{xGPS}$ is the second RMS value associated with the GNSS positioning information in the second direction, $\hat{w}$ corresponds to noise originating from both the GNSS navigation system and the DR propagation system, $\hat{M}$ corresponds to a constant including GNSS measurement bias and DR constant error, and n is a number of measurements.

5. The method of claim 1, wherein calculating the EHPE further comprises:
    calculating an error parameter in a first direction and a second direction based on the application of the Kalman filter.

6. The method of claim 5, wherein calculating the error parameter in the first direction and the second direction is performed according to the following formulas:

$$\delta y_{k+1}=(\hat{y}_{k+1/k}-\hat{y}_k)-(y_{GNS,k+1}-y_{GNSS,k}); \text{ and}$$

$$\delta x_{k+1}=(\hat{x}_{k+1/k}-\hat{x}_k)-(x_{GNSS,k+1}-x_{GNSS,k});$$

where $\delta y_{k+1}$ is the error parameter in the first direction, $\delta x_{k+1}$ is the error parameter in the second direction, $\hat{y}_{k+1/k}$ corresponds to a one-step prediction of position in the first direction from a step k to a step k+1, $\hat{y}k$ corresponds to a position estimate in the first direction at a step k, $y_{GNSS,k+1}$ corresponds to a GNSS measurement of position in the first direction at a step k+1, $y_{GNSS,k}$ corresponds to a GNSS measurement of position in the first direction at a step k, $\hat{x}_{k+1/k}$ corresponds to a one-step prediction of position in the second direction, $\hat{x}k$ corresponds to a position estimate in the second direction at a step k, $x_{GNSS,k+1}$ corresponds to a GNSS measurement of position in the second direction at a step k+1, and $x_{GNSS,k}$ corresponds to a GNSS measurement of position in the second direction at a step k.

7. The method of claim 5, wherein calculating the EHPE further comprises:
    calculating a first RMS value associated with the DR positioning information in a first direction and a second RMS value associated with the DR positioning information in a second direction.

8. The method of claim 7, wherein calculating the first RMS value associated with the DR positioning information in the first direction and the second RMS value associated with the DR positioning information in the second direction is performed according to the following formulas:

$$RMS_{yDR} = \frac{1}{n-1}\sum_{i=1}^{n-1} \delta y_i^2; \text{ and}$$

$$RMS_{xDR} = \frac{1}{n-1}\sum_{i=1}^{n} \delta x_i^2;$$

where $RMS_{yDR}$ is the first RMS value associated with the DR positioning information in the first direction, $RMS_{DR}$ is the second RMS value associated with the DR positioning information in the second direction, $\delta y$ corresponds to the error parameter in the first direction, $\delta x$ corresponds to the error parameter in the second direction, and n is a number of measurements.

9. The method of claim 7, wherein the calculated EHPE is based on
    the first and second RMS values associated with the DR positioning information in the first and second directions and the first and second RMS values associated with the GNSS positioning information in the first and second directions.

10. A non-transitory computer-readable medium having computer-executable instructions stored thereon for determining an Estimated Horizontal Position Error (EHPE) with respect to a navigation system onboard a telematics-equipped vehicle by utilizing a Global Navigation Satellite System (GNSS) navigation system in combination with a dead reckoning (DR) navigation system, the computer-executable instructions, when executed by a processor, causing the following steps to be performed:
    receiving GNSS positioning information from the GNSS navigation system;
    receiving DR positioning information from the DR navigation system;
    applying a Kalman filter to the GNSS positioning information and the DR positioning information;
    calculating the EHPE corresponding to the navigation system onboard the telematics-equipped vehicle based on the GNSS positioning information, the DR positioning information, and the Kalman filter, wherein calculating the EHPE comprises:
        calculating a first root mean square (RMS) value associated with the GNSS positioning information in a first direction and a second RMS value associated with the GNSS positioning information in a second direction.

11. The non-transitory computer-readable medium of claim 10, wherein calculating the EHPE further comprises:
    calculating a first difference between a GNSS measurement of the vehicle location and a DR propagation measurement of the vehicle location in a first direction and a second difference between the GNSS measurement of the vehicle location and the DR propagation measurement of the vehicle location in a second direction.

12. The non-transitory computer-readable medium of claim 11, wherein calculating the first difference and the second difference is performed according to the following formulas:

$$\Delta y=(DR\text{Lat}-G\text{Lat})\times(M+h); \text{ and}$$

$$\Delta x=(DR\text{Long}-G\text{Long})\times(N+h)\times\cos(DR\text{Lat});$$

where M is meridian radius, N is prime vertical radius, $\Delta y$ is the difference in the first direction, $\Delta x$ is the difference in the second direction, DRLat is a DR propagation measurement in the first direction, GLat is a GNSS measurement in the first direction, h is a GNSS measurement of altitude, DRLong is a DR propagation measurement in the second direction, and GLong is a GNSS measurement in the second direction.

13. The non-transitory computer-readable medium of claim 10, wherein calculating the first RMS value associated with the GNSS positioning information in the first direction and the second RMS value associated with the GNSS positioning information in the second direction is performed according to the following formulas:

$$RMS_{yGPS} \approx \frac{1}{n}\sum_{i=1}^{n} \hat{w}_y^2(i) + \hat{M}_y^2; \text{ and}$$

$$RMS_{xGPS} \approx \frac{1}{n}\sum_{i=1}^{n} \hat{w}_x^2(i) + \hat{M}_x^2;$$

where $RMS_{yGPS}$ is the first RMS value associated with the GNSS positioning information in the first direction, $RMS_{xGPS}$ is the second RMS value associated with the GNSS positioning information in the second direction, $\hat{w}$ corresponds to noise originating from both the GNSS navigation system and the DR propagation system, $\hat{M}$ corresponds to a constant including GNSS measurement bias and DR constant error, and n is a number of measurements.

14. The non-transitory computer-readable medium of claim 10, wherein calculating the EHPE further comprises:
calculating an error parameter in a first direction and a second direction based on the application of the Kalman filter.

15. The non-transitory computer-readable medium of claim 14, wherein calculating the error parameter in the first direction and the second direction is performed according to the following formulas:

$$\delta y_{k+1} = (\hat{y}_{k+1/k} - \hat{y}_k) - (y_{GNSS,k+1} - y_{GNSS,k}); \text{ and}$$

$$\delta x_{k+1} = (\hat{x}_{k+1/k} - \hat{x}_k) - (x_{GNSS,k+1} - x_{GNSS,k});$$

where $\delta y_{k+1}$ is the error parameter in the first direction, $\delta x_{k+1}$ is the error parameter in the second direction, $\hat{y}_{k+1/k}$ corresponds to a one-step prediction of position in the first direction from a step k to a step k+1, $\hat{y}_k$ corresponds to a position estimate in the first direction at a step k, $y_{GNSS,k+1}$ corresponds to a GNSS measurement of position in the first direction at a step k+1, $y_{GNSS,k}$ corresponds to a GNSS measurement of position in the first direction at a step k, $\hat{x}_{k+1/k}$ corresponds to a one-step prediction of position in the second direction, $\hat{x}_k$ corresponds to a position estimate in the second direction at a step k, $x_{GNSS,k+1}$ corresponds to a GNSS measurement of position in the second direction at a step k+1, and $x_{GNSS,k}$ corresponds to a GNSS measurement of position in the second direction at a step k.

16. The non-transitory computer-readable medium of claim 14, wherein calculating the EHPE further comprises:
calculating a first RMS value associated with the DR positioning information in a first direction and a second RMS value associated with the DR positioning information in a second direction.

17. The non-transitory computer-readable medium of claim 16, wherein calculating the first RMS value associated with the DR positioning information in the first direction and the second RMS value associated with the DR positioning information in the second direction is performed according to the following formulas:

$$RMS_{yDR} = \frac{1}{n-1} \sum_{i=1}^{n-1} \delta y_i^2; \text{ and}$$

$$RMS_{xDR} = \frac{1}{n-1} \sum_{i=1}^{n-1} \delta x_i^2;$$

where $RMS_{yDR}$ is the first RMS value associated with the DR positioning information in the first direction, $RMS_{xDR}$ is the second RMS value associated with the DR positioning information in the second direction, $\delta y$ corresponds to the error parameter in the first direction, $\delta x$ corresponds to the error parameter in the second direction, and n is a number of measurements.

18. The non-transitory computer-readable medium of claim 16, wherein the calculated EHPE is based on
the first and second RMS values associated with the DR positioning information in the first and second directions and the first and second RMS values associated with the GNSS positioning information in the first and second directions.

* * * * *